US011286688B2

United States Patent
Alfredsson (10) Patent No.: US 11,286,688 B2
(45) Date of Patent: Mar. 29, 2022

(54) DOOR HANDLE ARRANGEMENT WITH INTERMEDIATE OPENING POSITION

(71) Applicant: Industrilås i Nässjö Aktiebolag, Nässjö (SE)

(72) Inventor: Bengt-Åke Alfredsson, Bodafors (SE)

(73) Assignee: Industrilås i Nässjö Aktiebolag, Nässjö (SE)

( * ) Notice: Subject to any disclaimer, the term of this patent is extended or adjusted under 35 U.S.C. 154(b) by 287 days.

(21) Appl. No.: 16/487,751

(22) PCT Filed: Mar. 1, 2018

(86) PCT No.: PCT/EP2018/055032
§ 371 (c)(1),
(2) Date: Aug. 21, 2019

(87) PCT Pub. No.: WO2018/158360
PCT Pub. Date: Sep. 7, 2018

(65) Prior Publication Data
US 2020/0232252 A1   Jul. 23, 2020

(30) Foreign Application Priority Data
Mar. 2, 2017   (EP) ..................... 17158835

(51) Int. Cl.
*E05B 15/00*   (2006.01)
*E05C 5/00*   (2006.01)
(Continued)

(52) U.S. Cl.
CPC ............ *E05B 15/0053* (2013.01); *E05C 5/00* (2013.01); *E05B 5/00* (2013.01); *E05B 17/0025* (2013.01);
(Continued)

(58) Field of Classification Search
CPC ............. Y10T 292/57; Y10T 292/0863; Y10T 292/0886; E05B 15/0053; E05B 5/00;
(Continued)

(56) References Cited

U.S. PATENT DOCUMENTS 2,631,051 A * 3/1953 Lickteig, Jr. ............ E05B 63/10
292/244
3,325,200 A * 6/1967 Fowler ...................... E05C 5/00
292/113
(Continued)

FOREIGN PATENT DOCUMENTS

DE             484219 C   * 10/1929  ............. E05C 9/042
DE          4142531 A1      6/1993
(Continued)

OTHER PUBLICATIONS

International Search Report for International Application No. PCT/EP2018/055032, dated Jun. 4, 2018 (3 pages).
(Continued)

*Primary Examiner* — Christine M Mills
*Assistant Examiner* — Steven A Tullia
(74) *Attorney, Agent, or Firm* — Kagan Binder, PLLC (57) ABSTRACT

The present application relates to a handle arrangement (1) for a door (10), comprising a handle (2) and a locking clamp (3) for engaging a locking element on a door frame (70). The locking clamp is arranged to rotate around a first axis (A) from a locking to an intermediate position and to move linearly along a second axis (B) from the intermediate to an open position, when the handle is moved between a closed, intermediate, and open state. The arrangement comprises a resilient means (8) arranged to keep the locking clamp from moving from the intermediate position towards the open position until a force applied in the direction of the linear movement of the locking clamp towards the open position
(Continued)

exceeds a resilient force of the resilient means. With this arrangement, a handle arrangement which may be opened in several steps is provided such that the opening of a door may be performed in a controlled manner.

15 Claims, 10 Drawing Sheets

(51) Int. Cl.
  *E05B 5/00*   (2006.01)
  *E05B 17/00*  (2006.01)
  *E05B 15/04*  (2006.01)
(52) U.S. Cl.
  CPC . *E05B 2015/0458* (2013.01); *E05Y 2900/132* (2013.01)
(58) Field of Classification Search
  CPC ...... E05B 5/003; E05B 5/006; E05B 17/0025; E05B 2015/0458; E05B 85/10; E05B 85/103; E05B 85/107; E05C 5/00; E05Y 2900/132; Y10S 292/31
  See application file for complete search history.

(56) References Cited

U.S. PATENT DOCUMENTS

| | | | | |
|---|---|---|---|---|
| 3,743,336 A * | 7/1973 | Andrews | ........... | E05C 1/145 292/173 |
| 3,831,580 A * | 8/1974 | McLean | ........... | F24C 15/022 126/197 |
| 4,639,021 A * | 1/1987 | Hope | ........... | E05C 9/043 292/40 |
| 4,655,365 A | 4/1987 | Miller | | |
| 7,234,735 B2 * | 6/2007 | Harada | ........... | E05C 5/00 292/170 |
| 2006/0012192 A1 | 1/2006 | Wang et al. | | |
| 2008/0238109 A1 * | 10/2008 | Huang | ........... | E05C 5/00 292/95 |
| 2010/0244465 A1 * | 9/2010 | de Mola | ........... | E05B 83/16 292/164 |
| 2012/0272695 A1 * | 11/2012 | Pickar | ........... | E05B 83/44 70/91 |
| 2014/0284946 A1 | 9/2014 | Bennett et al. | | |

FOREIGN PATENT DOCUMENTS

| | | | | |
|---|---|---|---|---|
| DE | 202004010362 U1 * | 9/2004 | ........... | E05C 5/00 |
| EP | 0411271 A1 * | 2/1991 | ........... | E05B 63/126 |
| EP | 1526236 A2 * | 4/2005 | ........... | E05C 1/145 |
| EP | 2402236 A1 | 1/2012 | | |
| EP | 2757216 A2 * | 7/2014 | ........... | E05B 17/0025 |
| EP | 2995755 A1 * | 3/2016 | ........... | E05B 17/0025 |
| FR | 2863000 A1 * | 6/2005 | ........... | E05B 65/1006 |
| GB | 2170858 A | 8/1986 | | |
| GB | 2210098 A * | 6/1989 | ........... | E05B 63/06 |
| WO | 2004055305 A1 | 7/2004 | | |
| WO | WO-2004076786 A1 * | 9/2004 | ........... | E05C 3/162 |

OTHER PUBLICATIONS

E-Space abstract for EP 2402236.
E-Space abstract for DE 4142531.

* cited by examiner

DOOR HANDLE ARRANGEMENT WITH INTERMEDIATE OPENING POSITION

CROSS-REFERENCE TO RELATED APPLICATIONS

This application claims priority to International Application No. PCT/EP2018/055032, filed Mar. 1, 2018 and titled "DOOR HANDLE ARRANGEMENT WITH INTERMEDIATE OPENING POSITION," which in turn claims priority from a European Patent Application having serial number 1758835.3, filed Mar. 2, 2017, titled "DOOR HANDLE ARRANGEMENT WITH INTERMEDIATE OPENING POSITION," both of which are incorporated herein by reference in their entireties

TECHNICAL FIELD

The present disclosure relates to a door handle arrangement, and especially an arrangement for a door handle used in industrial applications.

BACKGROUND

In the field of handles for doors, cabinets, and windows, the use of a door handle as a means to move a latch or locking device for opening or closing of doors is a common way of arranging the opening or closing of a door. In some industrial applications such as electrical enclosures or ventilation ducts, there may be a need to control the opening of the door such that it is not uncontrollably flung open. This may for example be the case when the door is located in a ceiling or that there may be a pressurized fluid in the space to be opened.

The pressurized fluid may cause an explosive opening of the door when a lock or handle is opened. This may injure a user opening the door. Hence, there is a need for a door handle solution which prevent the opening of a door to a pressurized space to injure a user.

SUMMARY

It is an object of the present invention to provide an improved solution that alleviates the mentioned drawbacks with present devices.

The invention is defined by the appended independent claims, with embodiments being set forth in the dependent claims, in the following description and in the attached drawings.

According to a first aspect of the invention, there is provided a handle arrangement for a door comprising a handle and a locking clamp for engaging a locking element on a door frame. The locking clamp is arranged to rotate around a first axis from a locking position to an intermediate position when the handle is moved from a closed state towards an intermediate state. The locking clamp is arranged to move linearly along a second axis from the intermediate position to an open position when the handle is moved from the intermediate state towards an open state. The handle arrangement comprises a resilient means arranged to, by a resilient force, keep the locking clamp from moving from the intermediate position towards the open position until a force applied in the direction of the linear movement of the locking clamp towards the open position exceeds the resilient force of the resilient means.

With this arrangement, a handle arrangement which may be opened in several steps is provided. By this multistep opening, the opening of a door, cabinet or window may be performed in a controlled manner. The arrangement further provides a simple construction where no additional parts are required to achieve the multi-step function of the handle arrangement.

The intermediate position of the locking clamp and intermediate state of the handle are defined as a position or state in-between the open and locking/closed position or state respectively.

When the locking clamp is rotated around the first axis from the locking position into the intermediate position, the locking clamp may be partly released from a locking element of a door frame or wall such that the door remains closed but the pressure may be released. This intermediate position, allowing the pressure to drop, ensures that the door is not uncontrollably flung open due to a pressure difference between the enclosure to be opened and the surrounding area. It may also serve as a protection for a door which opens downwards from for example a ceiling or tilting wall such that the door does not fall downwards uncontrollably.

When the pressure has been released, or control achieved, the handle may be turned from its intermediate state to its open state, which also causes the locking clamp to move from its intermediate position into its open position. In the open position, the locking clamp is fully retracted and released from the locking element such that the door may be opened in a controlled manner.

According to one embodiment, the handle arrangement may further comprise an actuator, wherein the actuator may be arranged between the handle and the locking clamp and arranged to move linearly along the second axis. The actuator may serve as a means to push or pull the locking clamp into the open, intermediate, and locking positions by executing a force on the locking clamp. When the handle is moved from the closed state towards the intermediate state, the actuator may pull the locking clamp such that the locking clamp rotates to the intermediate position. During such rotation, the resilient means may prevent the locking clamp from moving linearly towards the open position. When the handle is moved further towards the open state, the actuator may pull the locking clamp further to move linearly along the second axis towards the open position.

According to a further embodiment, the actuator may be coupled to the locking clamp by a link. By coupling the actuator to the locking clamp by a link, the locking clamp and the actuator may move along the second axis between the open and intermediate positions of the locking clamp and the locking clamp may rotate around the first axis between the intermediate and locking positions while the actuator remains to move along the second axis.

In another embodiment, the link may be rotatably arranged to the locking clamp at a first end and rotatably arranged to the actuator at a second end. The rotatable connection between the link and the actuator and the locking clamp respectively, may provide for a movement where the second end arranged to the actuator may move along the second axis and rotate in relation to the actuator, while the first end may rotate in relation to the locking clamp and rotate around its second end away from the second axis.

According to another embodiment, the link may enable the rotation of the locking clamp from the locking position to the intermediate position when the actuator moves linearly along the second axis. The link may rotate in relation both to the locking clamp and to the actuator, respectively, such that when the locking clamp is in the locking position, the second end of the link and the part of the actuator to which it is rotatably connected, may be located on the second axis while the first end of the link may have been rotated away from the second axis around its second end, being rotatably connected to the locking clamp in its locking position. The rotatable connection to the second end of the link implies that as the actuator moves along the second axis, the second end of the link may move with the actuator while the first end of the link rotates around the second end towards the second axis until it reaches a position where no further rotation is achievable. As the first end rotates towards the second axis, the end of the locking clamp to which it is rotatably attached, may also be forced to move in this direction, causing a rotation of the locking clamp around the first axis from its locking position towards its intermediate position. In one embodiment, when the locking clamp is in the intermediate position, the first end of the link may be offset of the second axis relative to the second end of the link. The first end of the link being offset of the second axis may provide that the link, when the locking clamp rotates from the intermediate position towards the locking position, pushes the locking clamp such that it is lifted at its end connected to the link, and thereby performs the rotation. When the locking clamp has been moved from the open position to the intermediate position and further linear movement of the locking clamp is prevented, the link provides a lifting of the locking clamp.

In another embodiment, the second axis may be perpendicular to the first axis. The second axis may be the axis along which the linear movement of the actuator occurs while the rotation of the locking clamp occurs around the first axis. The locking clamp may also move linearly along the second axis as it moves between its intermediate and open positions. When the locking clamp is moved linearly along the second axis, the position of the first axis being the rotational axis of the locking clamp may move along the second axis.

In another embodiment the locking clamp may comprise at least one pin extending along the first axis. The at least one pin extending along the first axis may serve as the means around which the rotation of the locking clamp occurs when it rotates between its locking and intermediate positions.

According to a further embodiment, the least one pin may be arranged to interact with the resilient means. The at least one pin may further interact with the resilient means such that the resilient force which may keep the locking clamp from moving from the intermediate position towards the open position is exerted on the pin.

In yet another embodiment, the resilient means may be a flat spring. The resilient means being a flat spring may provide for shaping the spring such that when the force exerted on the at least one pin is lower than the resilient force, the pin remains still or rotates around the first axis in its current position adjacent the flat spring and such that when the force exerted on the at least one spring exceeds the resilient force, the at least one pin of the locking clamp moves from its current position to another position relative to the flat spring.

In a further embodiment, the locking clamp may comprise at least one pin extending along the first axis arranged to interact with the flat spring, and wherein the flat spring may comprise a flat portion and a curved portion, wherein the flat spring may be arranged to keep the pin at the curved portion in the locking and intermediate positions of the locking clamp and wherein the pin may be located at the flat portion when the locking clamp is in the open position. The curved portion of the flat spring may have a curvature essentially similar to that of the at least one pin. The curved portion may further keep the at least one pin in position during rotation of the locking clamp. When the force applied in the direction of the linear movement of the locking clamp towards the open position exceeds the resilient force of the spring, the at least one pin moves past the curved portion onto the flat portion of the spring.

According to another embodiment, the flat spring may comprise a shoulder connecting the flat portion and the curved portion. The portions of the flat spring may be connected by a shoulder which defines the division between the curved and flat sections of the flat spring.

According to another embodiment, the locking clamp and the resilient means may be at least partially covered by a housing. The housing may protect the locking clamp and the resilient means. The housing may further provide support to the resilient means such that the relevant resilient force can be exerted.

According to a further embodiment, the resilient means may in one end be attached to the housing and in another opposite end moveable relative to the housing. When a force is exerted on the locking clamp towards the open position, the resilient force of the resilient means may be exceeded such that the resilient means is moved relative the housing by the locking clamp. The resilient means may be moved such that at least the end being moveable relative to the housing is moved.

According to one embodiment, the resilient means may be a flat spring comprising a flat portion and a curved portion, and wherein the flat spring is moveable relative to the housing adjacent to the curved portion.

According to one embodiment, the locking clamp may in the locking position be configured to prevent movement of the door relative to the door frame, and in the intermediate position may be configured to enable a limited movement of the door relative to the door frame but prevent complete opening of the door relative to the door frame. In the locking position, the locking clamp may keep the door closed in a locked manner and prevent opening of the door. In the intermediate position, the locking clamp is moved to enable a partly opening of the door relative to the door frame. The partly opening of the door may in one embodiment enable an opening of between 1-5 cm. The partly opening may be limited by the locking clamp in the intermediate position engaging the locking element on the door frame. In the open position, the locking clamp may be moved to enable complete opening of the door relative to the door frame. The locking clamp may in the open position not engage the locking element on the door frame.

BRIEF DESCRIPTION OF THE DRAWINGS

This and other aspects of the present invention will now be described more in detail, with reference to the appended drawings showing a currently preferred embodiment of the invention.

DETAILED DESCRIPTION

The present invention will be described more fully hereinafter with reference to the accompanying drawings. In the drawings, like numbers refer to like elements.

Figure 1:
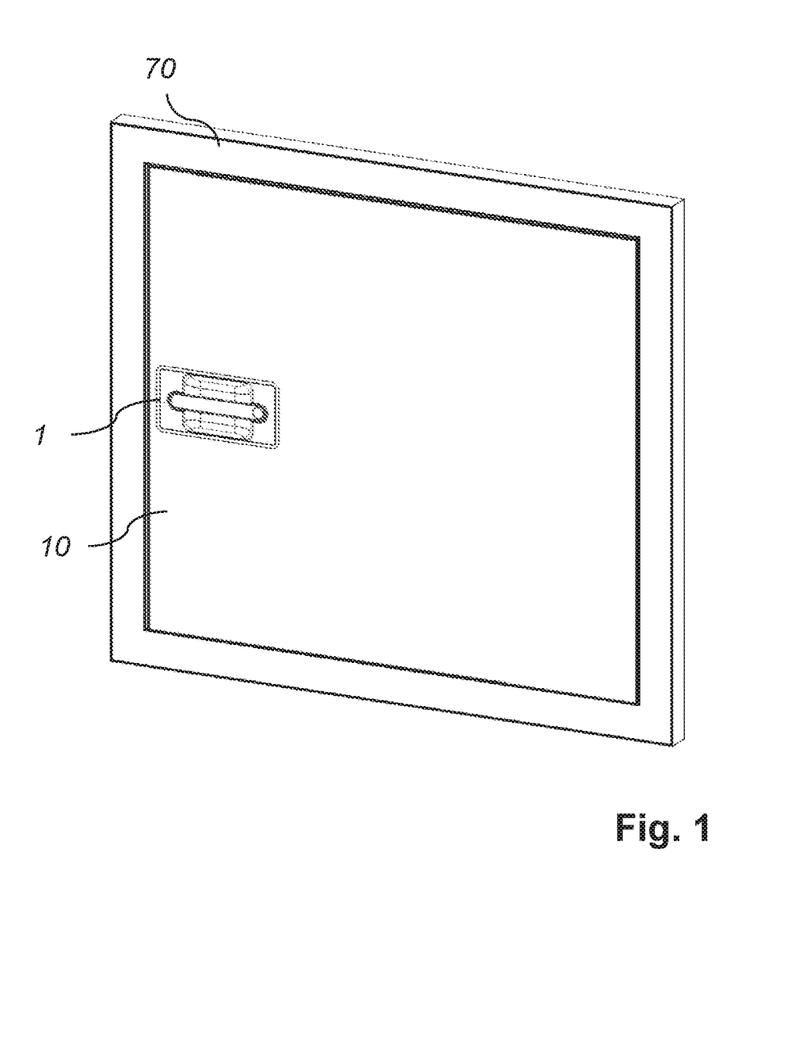
FIG. 1 shows a perspective view of a door arrangement comprising a handle arrangement according to an embodiment of the invention.

FIG. 1 illustrates a door arrangement comprising a door 10 arranged on a door frame 70. On the door 10 a handle arrangement 1 is arranged.

Figure 2A:
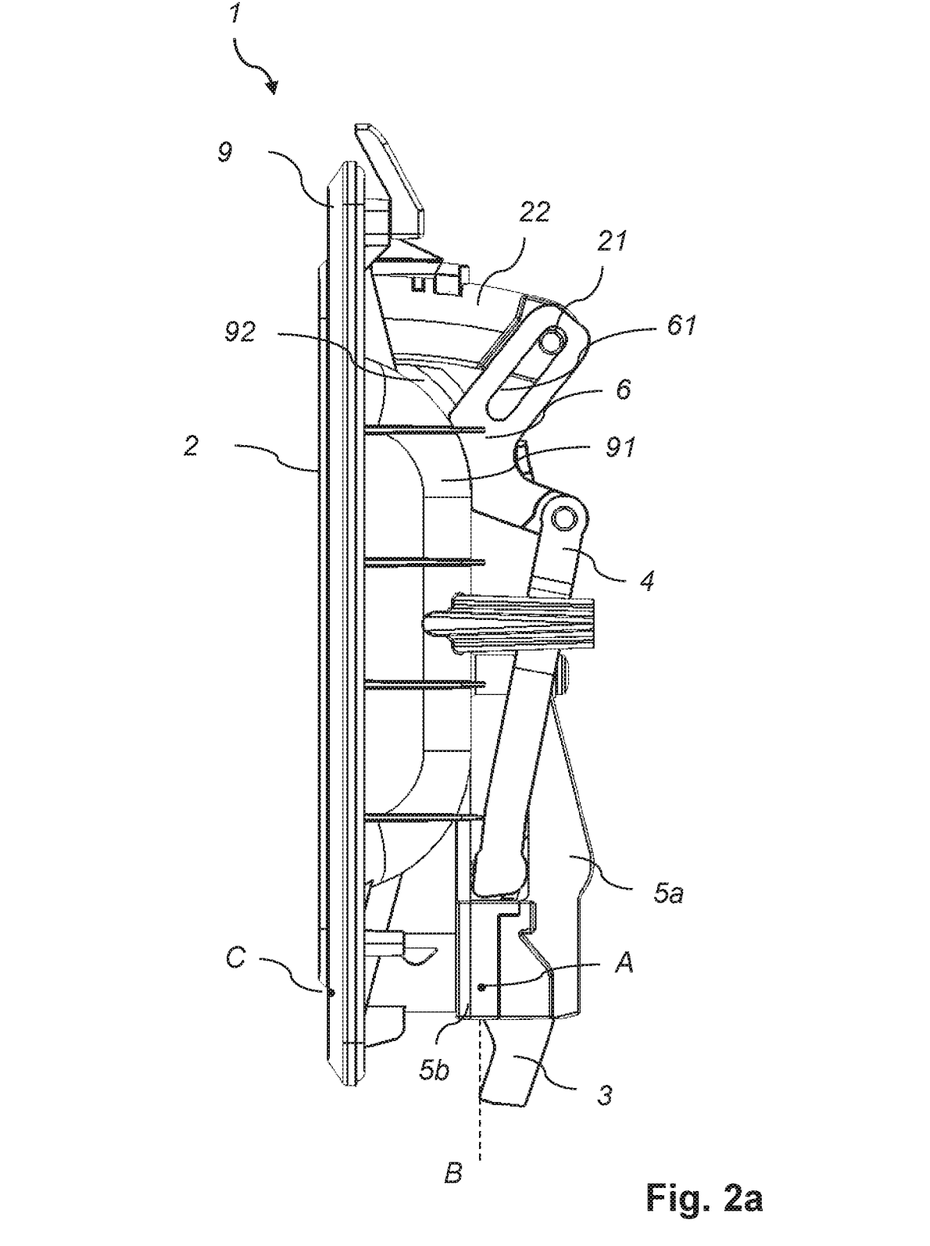
FIG. 2a shows the handle arrangement according to an embodiment of the invention with the locking clamp in the locking position and the handle in the closed state.
Figure 2B:
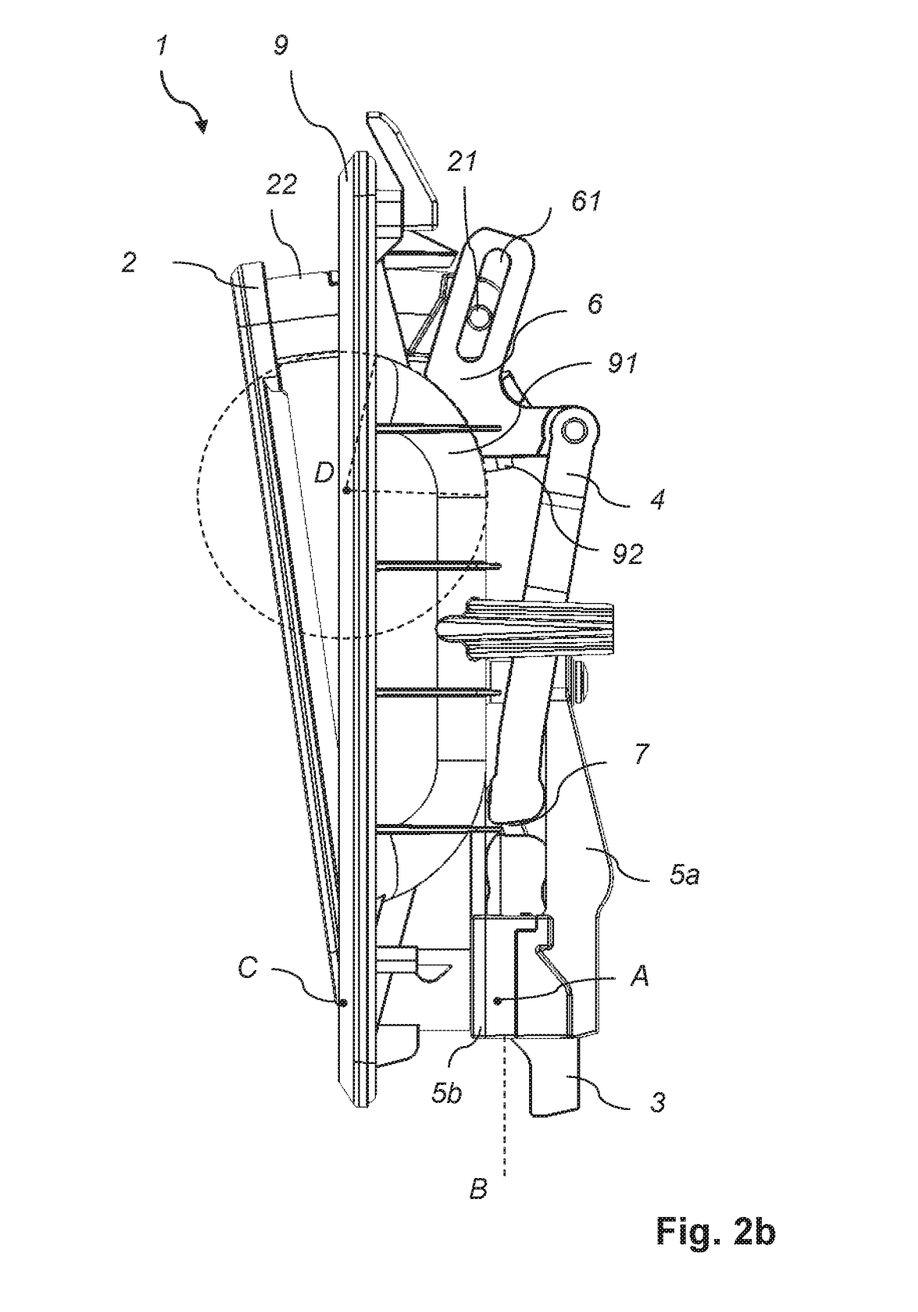
FIG. 2b shows the handle arrangement according to an embodiment of the invention with the locking clamp in the intermediate position and the handle in the intermediate state.
Figure 2C:
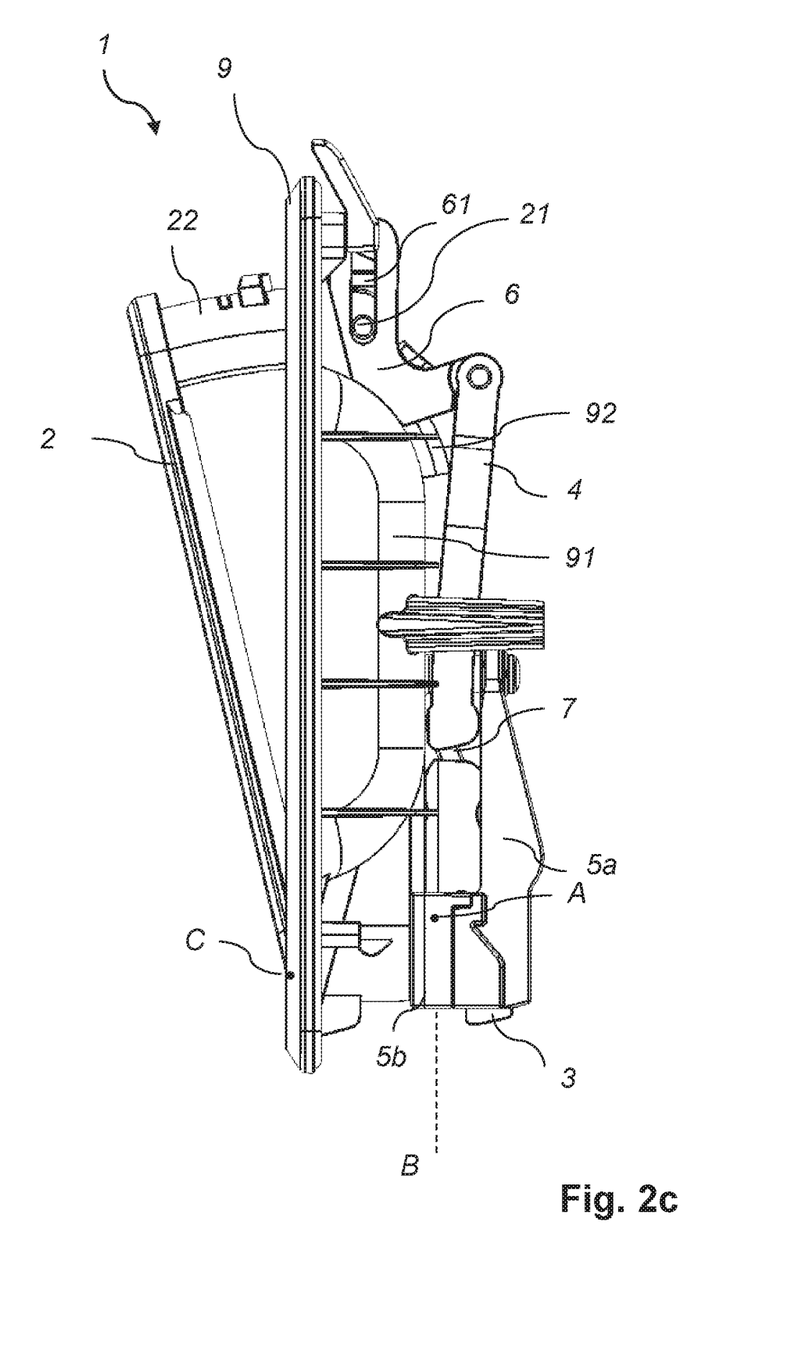
FIG. 2c shows the handle arrangement according to an embodiment of the invention with the locking clamp in the open position and the handle in the open state.

FIGS. 2a-2c illustrate the handle arrangement 1 according to an embodiment comprising a locking clamp 3, a handle 2, an upper 5a and a lower 5b housing, and an actuator 4 coupled to the locking clamp 3 by a link 7. The handle 2 is rotatable around a third axis C as it is moved between its closed, intermediate, and open states.

In FIG. 2a the handle arrangement is illustrated with the handle 2 in the closed state and the locking clamp 3 in the locking position. In the locking position, the locking clamp 3 has been rotated around the first axis A. The extending pins 31 are located under the curved portion 81 of the resilient means 8 and in a first corner of the lower housing 5b, as further illustrated in FIG. 6a. In the locking position, the locking clamp 3 is configured to be pressed towards a locking element on a door frame 70 (see FIGS. 7a-7c), thereby locking the door 10 to which the handle arrangement 1 is attached. Further, in the locking position, the actuator 4 is in a position along the second axis B, where it is stopped from further movement along the second axis B in the direction of the locking clamp 3 by the lower part 5b of the housing.

Figure 3:
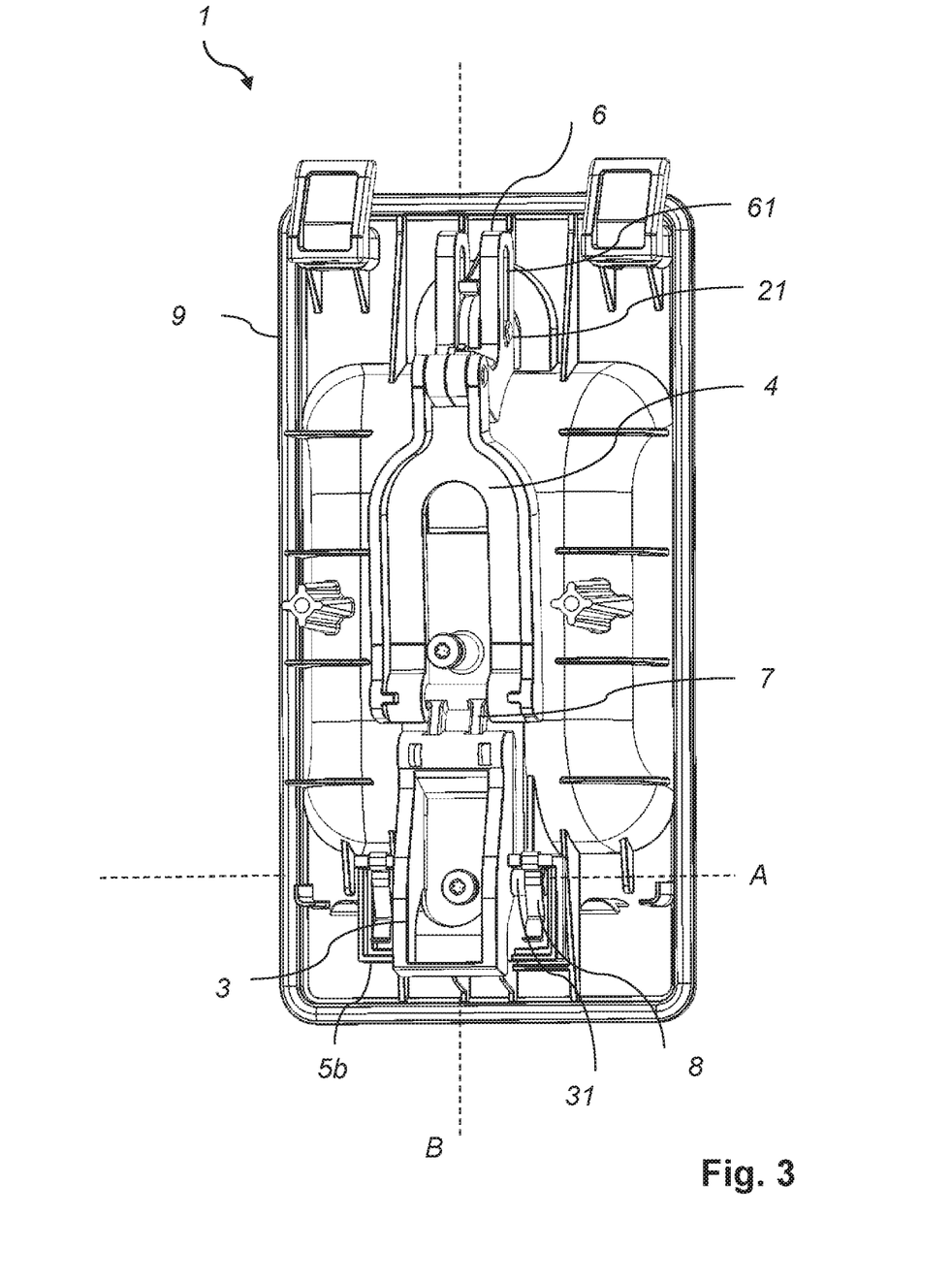
FIG. 3 shows a perspective view of the handle arrangement according to an embodiment of the invention.

The resilient means 8 may be a flat spring made of metal, hard plastics, or any other material capable of exerting a force on the extending pins 31 of the locking clamp. There may be two flat springs 8 in the handle arrangement 1, one on each side of the locking clamp 3 as illustrated in FIG. 3.

Figure 5:
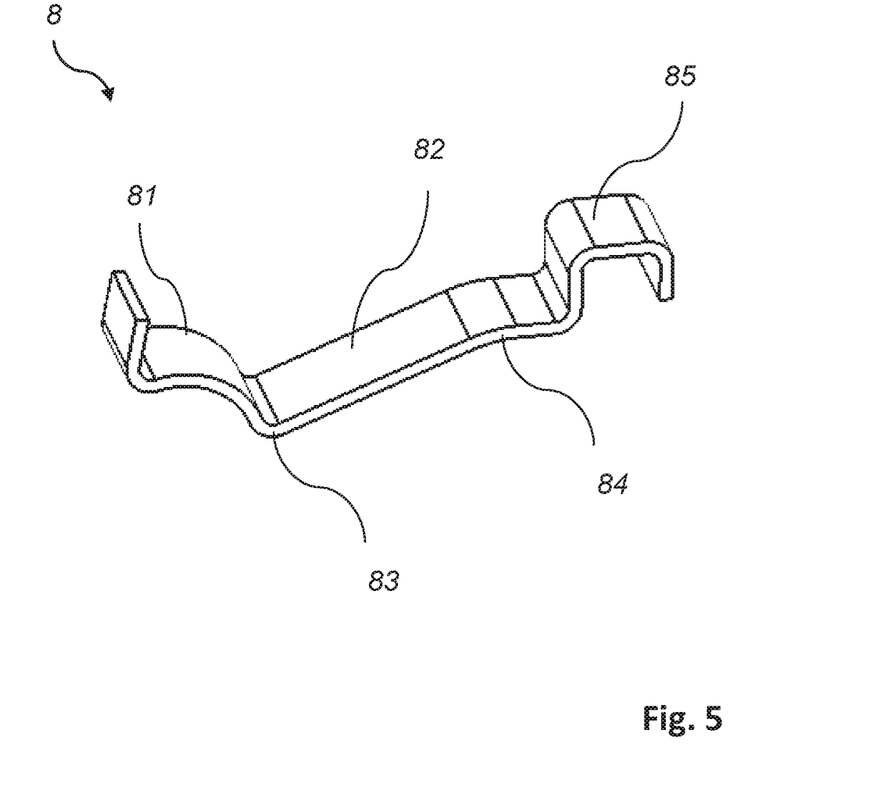
FIG. 5 show a detailed perspective view of the resilient means according to an embodiment of the invention.

The flat spring 8 is illustrated in FIG. 5 and comprises a curved portion 81 and a flat portion 82. The curved portion 83 has a curvature corresponding to the curvature of the extending pin such that the pin may rotate without any impact of the resilient force. The flat spring 8 further comprises an interacting portion 84 adapted to interact with the upper part 5a of the housing, further enhancing the resilient force exerted on the extending pins 31. The flat spring 8 also comprises a grasping portion 85 which is adapted to grasp around the lower part of the housing 5b and is fixated between the upper part 5a and the lower part 5b of the housing.

Figures 6A, 6B, 6C:
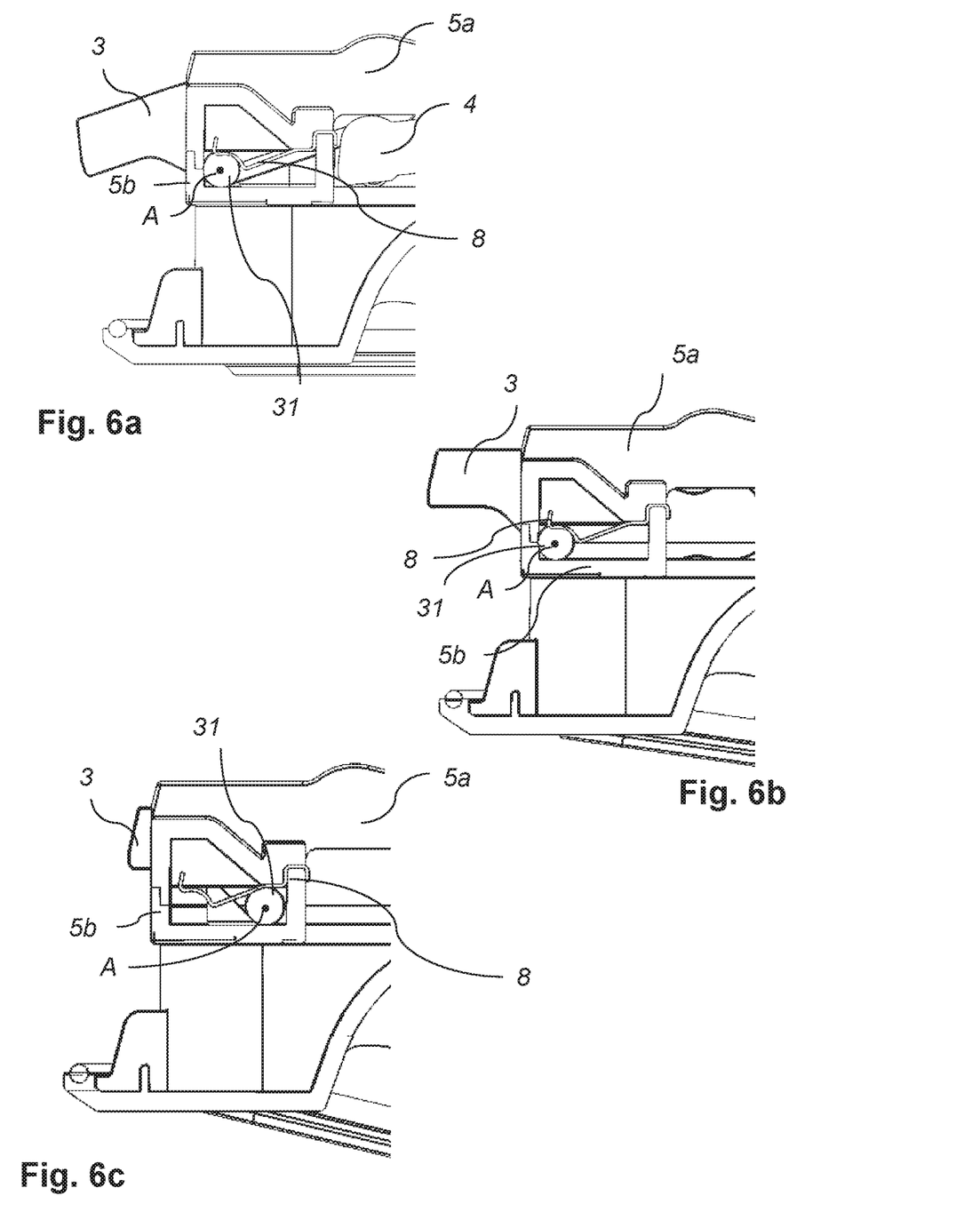
FIG. 6a shows a cross-sectional view of the locking clamp in the locking position according to an embodiment of the invention.
FIG. 6b shows a cross-sectional view of the locking clamp in the intermediate position according to an embodiment of the invention.
FIG. 6c shows a cross-sectional view of the locking clamp in the open position according to an embodiment of the invention.

In FIG. 2b, the handle 2 is in the intermediate state. As the handle 2 moves to the intermediate state, the actuator 4 moves along the second axis B and, via the link 7, pulls the locking clamp 3 to rotate around the first axis A into the intermediate position. As illustrated in FIG. 6b, in the intermediate position, the extending pin 31 is located under the curved portion 83 and in a first corner of the lower housing 5b.

FIG. 2c illustrates the handle 2 in its open state. As the handle 2 is rotated around the third axis C into the open state, the actuator 4 moves along the second axis B and via the link pulls the locking clamp 3 to move along the second axis B. When the force exerted on the locking clamp 3 exceeds the force of the flat spring 8, the locking clamp 3 is moved along the second axis B into the open position. As the locking clamp 3 moves along the second axis B into its open position, the first axis A around which the locking clamp 3 rotates, moves with the extending pin 31 along this axis B into a second corner of the lower housing 5b and to a position under the flat 82 and interacting 84 portions of the flat spring 8, as further illustrated in FIG. 6c. Rotation of the locking clamp 3 around the first axis A is prevented by the upper part 5a of the housing in any other position than the locking position and the intermediate position.

FIG. 3 illustrates an x-ray top view of the handle arrangement 1 in which the upper housing 5a is removed. The locking clamp 3 comprises two pins 31, extending along the first axis A on both sides of the locking clamp 3. The locking clamp 3 is illustrated in the open position where the extending pins 31 have been moved with the locking clamp 3 along the axis B such that they are located in the second corner of the lower housing 5b and under the flat 82 and interacting 84 portions of the spring 8.

Figure 7A:
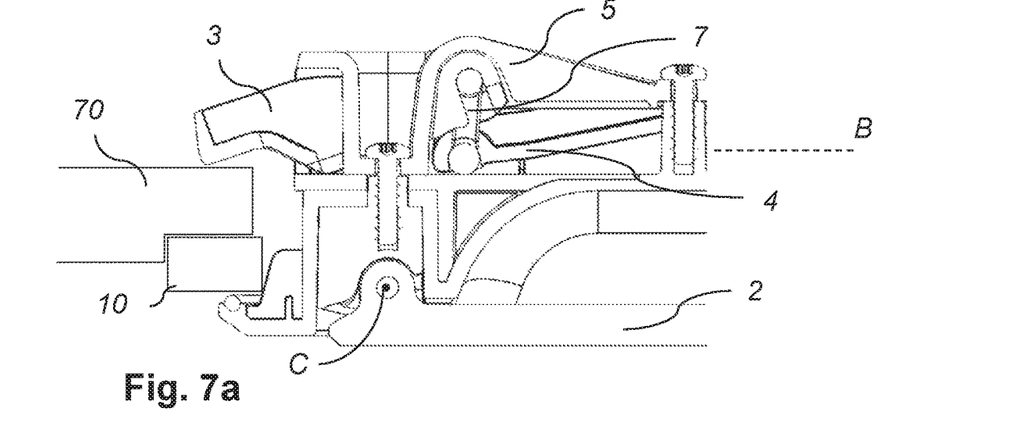
FIG. 7a shows a cross-sectional view of the link and the locking clamp in the locking position according to an embodiment of the invention.
Figure 7B:
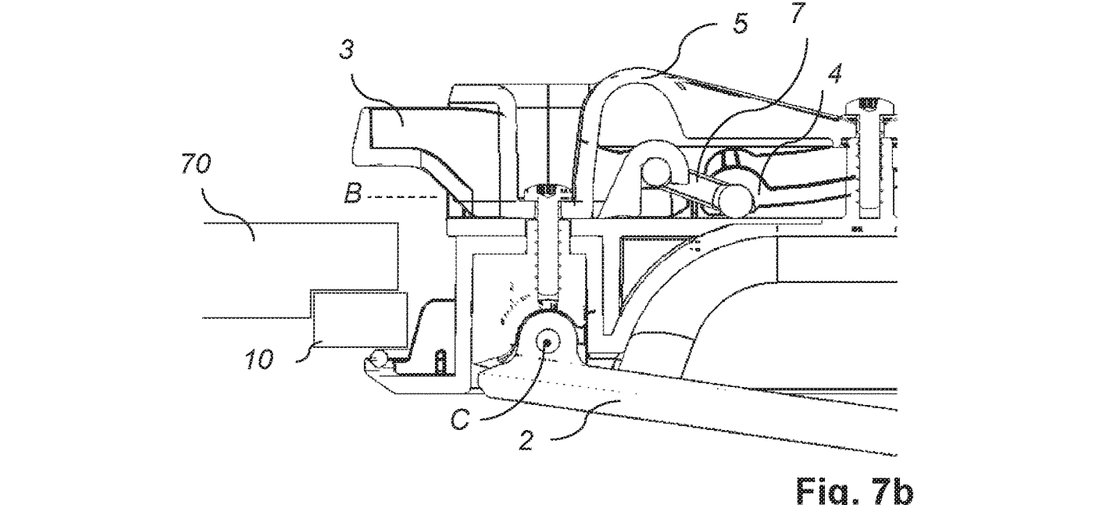
FIG. 7b shows a cross-sectional view of the link and the locking clamp in the intermediate position according to an embodiment of the invention.
Figure 7C:
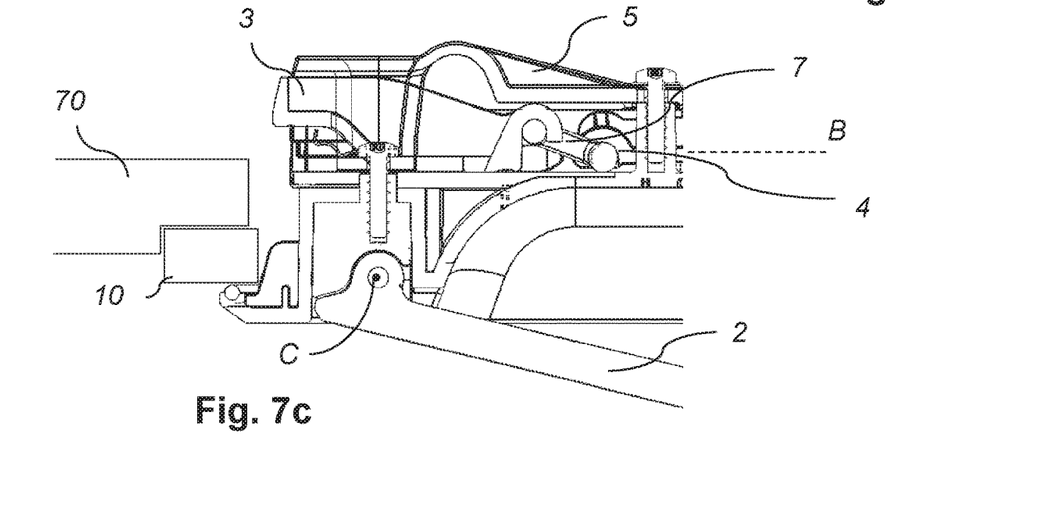
FIG. 7c shows a cross-sectional view of the link and the locking clamp in the open position according to an embodiment of the invention.

FIGS. 7a-7c illustrate the movement of the link 7 as the handle 2 moves between the open, intermediate, and closed states. In FIG. 7a, the handle is in the closed state and the locking clamp 3 in the locking position. A first end of the link 7 is rotatably connected to the locking clamp 3 and a second end of the link 7 is rotatably connected to the actuator 4. In the closed state of the handle 2, the second end of the link 7 is located with the actuator 4 on the second axis B and the first end of the link 7 has been rotated around the second end away from the second axis B.

In FIG. 7b, the handle 2 has been moved into its intermediate position. When the handle 2 is moved into the intermediate position, the actuator 4 is moved along the second axis B. The movement of the actuator 4 initiates a movement of second end of the link 7 along the second axis B. As the second end is pulled along the second axis B, the first end rotates around the second end towards the second axis B. The rotation of the first end initiates the rotation of the locking clamp 3 around the first axis A, from the locking position to the intermediate position. Since the link 7 is arranged between the actuator 4 and the locking clamp 3, a force lower than the resilient force of the flat springs 8 is exerted on the locking clamp 3 when the handle 2 is moved from the closed state to the intermediate state. Instead, the locking clamp 3 rotates around first axis A.

Further movement of the handle 2 into the open state moves the actuator further along the second axis B. Due to the force from the flat spring 8, a force greater than the resilient force is required to further move the locking clamp 3 from the intermediate position to the open position. When a force greater than the resilient force is applied on the actuator 4, the link 7 pulls on the end of the locking clamp 3 to which it is rotatably connected and thereby pulls the locking clamp 3 into the open position. Since no further rotation of the locking clamp 3 is possible when in the intermediate position, further pulling force from the actuator 4 provides force on the locking clamp 3 to exceed the resilient force and to move the locking clamp along second axis B to the open position.

As an alternative, or in addition to the previously disclosed features, a handle arrangement 1 may comprise a locking means for engaging with a locking element on a door frame 70, a handle 2 arranged to move rotationally around a third axis C, between an open and a closed state, and which may comprise a connection element 21. The handle arrangement 1 may further comprise an intermediate link 6 arranged between the handle 2 and the locking means and for transforming the rotational movement of the handle 2 to a substantially linear movement of the locking means. The handle 2 may be connected to the intermediate link 6 by the connection element 21, and the intermediate link 6 may be arranged to perform a movement following an arcuate path when the handle 2 is moved between the open state and the closed state.

Figure 4A:
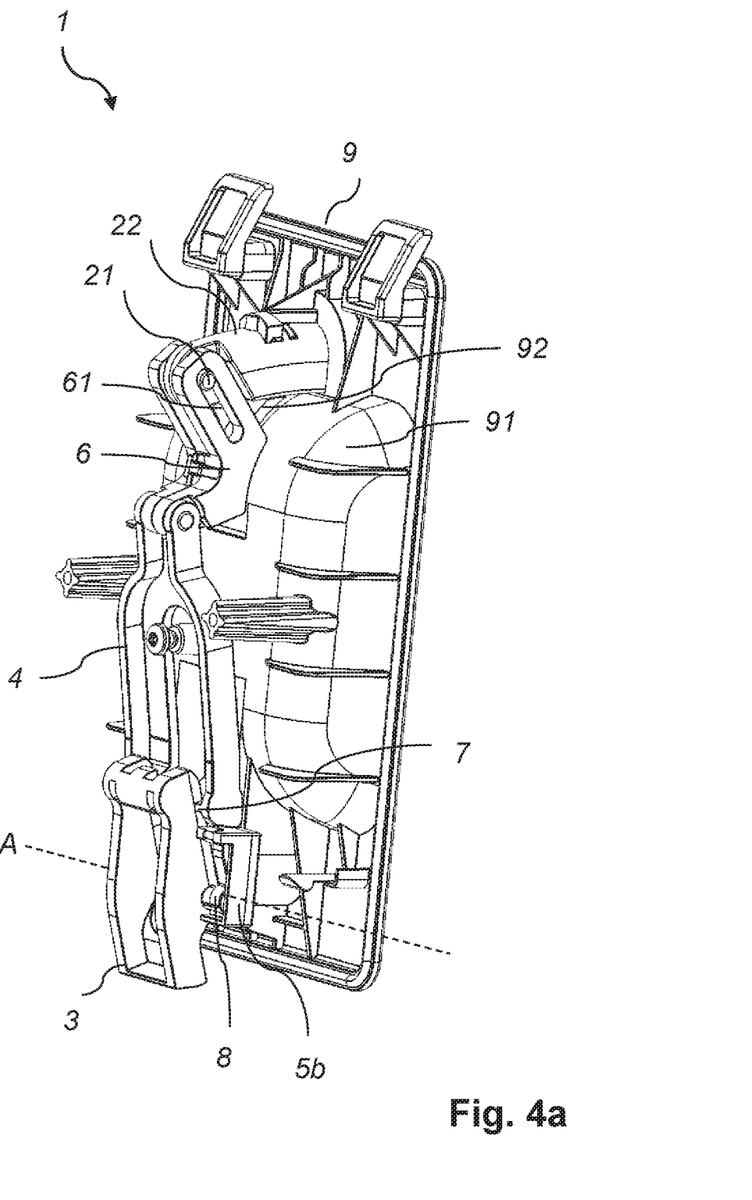
FIG. 4a shows a perspective view of the handle arrangement according to an embodiment of the invention with the locking clamp in the locking position.

The intermediate link 6 may be arranged to be moved between an open state and a closed state, each corresponding to the open and closed states of the handle respectively. In FIG. 4a, the intermediate link 6 is illustrated in its closed state.

The intermediate link 6 may comprise at least one guide slot 61 arranged to receive the connection element 21, as illustrated in FIG. 4a.

The connection element 21 is arranged to move along the at least one guide slot 61 when the handle 2 moves between the open and closed states. As illustrated in FIG. 4a, in the closed state of the intermediate link 6 and the handle 2, the connection element 21 is located at a first end of the guide slot 61. In the open state of the intermediate link 6 and the handle 2, illustrated in FIG. 4b, the connection element 21 has been moved along the guide slot 61 to a second end of the guide slot 61 as the handle 2 has moved from the closed state to the open state.

The rotation of the handle 2 may result in a rotational movement of the intermediate link 6 via the connection element's 21 interaction with the guide slot 61. The handle arrangement 1 may further comprise a handle body 9, wherein the body 9 comprises an arced portion 91. The arced portion 91 as illustrated for example in FIG. 2a, provides a pocket between the handle 2 and the handle body 9, such that rotation of the handle 2 by hand or by other gripping means, is facilitated as an area for receiving for example fingers, for gripping the handle 2 when moving this between its open or closed states, is provided.

Figure 4B:
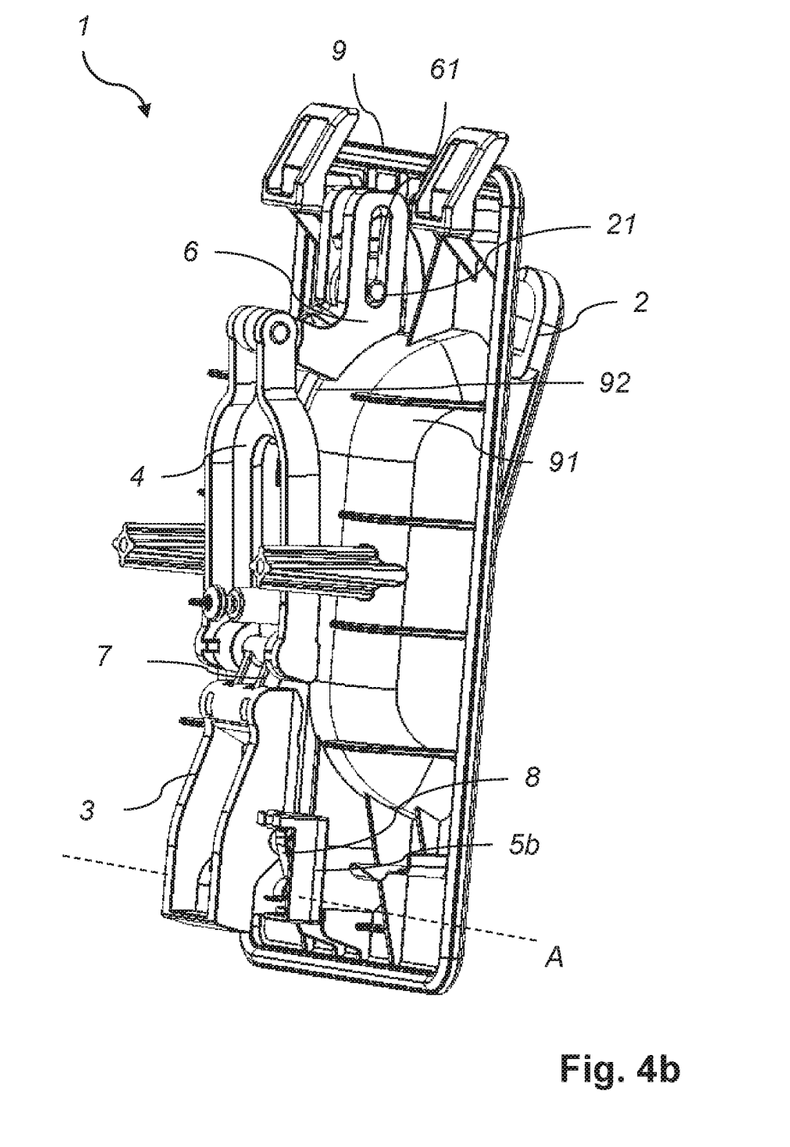
FIG. 4b shows an x-ray perspective view of the handle arrangement according to an embodiment of the invention with the locking clamp in the open position.

The arcuate path of the intermediate link 6 may correspond to the curvature of the arced portion 91 of the handle body 9. As illustrated in FIG. 4a, the intermediate link 6 is located on the arced portion 91 of the handle body 9 in the closed state. As the handle 2 is moved to its open state, the intermediate link 6 follows its arcuate path corresponding to curvature of the arced portion 91 into its open state position as illustrated in FIG. 4b.

The arced portion 91 of the handle body 9 may further comprise a guide track 92 arranged to guide the intermediate link 6 along its arcuate path. The guide track 92, illustrated in FIG. 2c, serves as a stabilizing guide when the intermediate link 6 is moved along its arcuate path as the handle 2 is moved between the open and closed states. The guide track 92 may be T-shaped. The intermediate link 6 may comprise a groove correspondingly shaped as the guide track 92 and configured to receive the guide track 92. The intermediate link 6 may be moveable along the guide track 92 and held in connection with the handle body 9 by means of the guide track 92 and the groove.

The arcuate path may provide a rotation around a fourth axis D, wherein the fourth axis D is located in the cavity of the arced portion 91 of the handle body 9 as illustrated in FIG. 2b. The rotation along the arcuate path may in another embodiment be around an axis located outside the entire handle arrangement, due to a flatter arc in the arcuate path.

The locking means may comprise an actuator 4 and a locking clamp 3. An example of such actuator 4 and locking clamp 3 are illustrated in FIG. 4a. The connection between the handle 2 and the intermediate link 6 and the rotational movement of these is transformed into a linear movement along axis B of the actuator 4 and the locking clamp 3.

The intermediate link 6 may be shaped in a V-shape, wherein a first flange of the V-shape may comprise an end rotatably connected to the actuator 4 and a second flange comprising the guide slot 61 for receiving the connection element 21. The rotatable connection between the intermediate link 6 and the actuator 4 transforms the rotational movement of the intermediate link 6 to a linear movement of the actuator 4. The coupling between the guide slot 61 and the connection element 21 translates the rotational movement of the handle 2 around the third axis C into a rotational movement of the intermediate link 6 around the fourth axis D.

A bottom portion of the V-shape may comprise an arc shaped surface configured to face the arced portion 91 of the handle body 91. The arc shaped surface has a curvature corresponding to the curvature of the arced portion 91 of the handle body 9.

The handle 2 may comprise a locking cylinder 22 and wherein the locking cylinder 22 extends from the handle 2 along a curvature of a circle with a radius corresponding to the length of the handle 2. The connection element 21 may further be arranged on the locking cylinder 22. The curvature of the locking cylinder 22 facilitates the transformation of the handle's 2 rotation around the third axis C to the rotation of the intermediate link 6 around the fourth axis D.

The connection element 21 may be formed as a pin extending into the guide slot 61 on the intermediate link 6.

The movement of the handle 2 between its open and closed states, corresponds to an accelerated movement of the actuator 4, that is the distance moved on the second axis B by the actuator when the handle 2 is moved between the open and closed states is larger than the distance the handle is moved.

The handle arrangement 1 according either embodiments of the disclosed invention may further comprise a lock arranged on the locking cylinder 22, which may be operated mechanically by for example a key or electrically. The lock may serve to lock the door 10 to which the handle arrangement 1 is attached when the locking clamp 3 is in its locking position and the handle 2 is in its closed state such that the door cannot be opened unauthorized without a key or to prevent unintentional opening of the door.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A handle arrangement for a door, comprising
a handle and
a locking clamp for engaging a locking element on a door frame,
the locking clamp being arranged to move from a locking position to an intermediate position when the handle is moved from a closed state towards an intermediate state, and
the locking clamp being arranged to move from the intermediate position to an open position when the handle is moved from the intermediate state towards an open state,
wherein
the locking clamp is arranged to move rotatably around a first axis from the locking position to the intermediate position when the handle is moved from the closed state towards the intermediate state,
the locking clamp is arranged to move linearly along a second axis from the intermediate position to the open position when the handle is moved from the intermediate state towards the open state,
wherein the handle arrangement comprises a resilient means arranged to, by a resilient force, keep the locking clamp from moving linearly along the second axis from the intermediate position towards the open position until the locking clamp has been rotated to the intermediate position and a force applied in the direction of the linear movement of the locking clamp towards the open position exceeds the resilient force of the resilient means.

2. A handle arrangement according to claim 1, further comprising an actuator, wherein the actuator is arranged between the handle and the locking clamp and arranged to move linearly along the second axis.

3. A handle arrangement according to claim 2, wherein the actuator is coupled to the locking clamp by a link.

4. A handle arrangement according to claim 3, wherein the link is rotatably arranged to the locking clamp at a first end and rotatably arranged to the actuator at a second end.

5. A handle arrangement according to claim 3, wherein the link enables the rotation of the locking clamp from the locking position to the intermediate position when the actuator moves linearly along the second axis.

6. A handle arrangement according to claim 1, wherein the second axis is perpendicular to the first axis.

7. A handle arrangement according to claim 1, wherein the locking clamp comprises at least one pin extending along the first axis.

8. A handle arrangement according to claim 7, wherein the at least one pin is arranged to interact with the resilient means.

9. A handle arrangement according to claim 1, wherein the resilient means is a flat spring.

10. A handle arrangement according to claim 9, wherein the locking clamp comprises at least one pin extending along the first axis arranged to interact with the flat spring, and wherein the flat spring comprises a flat portion and a curved portion, wherein the flat spring is arranged to keep the pin at the curved portion in the closed and intermediate positions of the locking clamp and wherein the pin is located at the flat portion when the locking clamp is in the open position.

11. A handle arrangement according to claim 10, wherein the flat spring comprises a shoulder connecting the flat portion and the curved portion.

12. A handle arrangement according to claim 1, wherein the locking clamp and the resilient means (8) are at least partially covered by a housing.

13. A handle arrangement according to claim 12, wherein the resilient means is in one end attached to the housing and in another opposite end moveable relative to the housing.

14. A handle arrangement according to claim 13, wherein the resilient means is a flat spring comprising a flat portion and a curved portion, and wherein the flat spring is moveable relative to the housing adjacent to the curved portion.

15. A handle arrangement according to claim 1, wherein the locking clamp in the locking position is configured to prevent movement of the door relative to the door frame and in the intermediate position is configured to enable a limited movement of the door relative to the door frame but prevent complete opening of the door relative to the door frame.

* * * * *